United States Patent Office 2,967,512
Patented Jan. 10, 1961

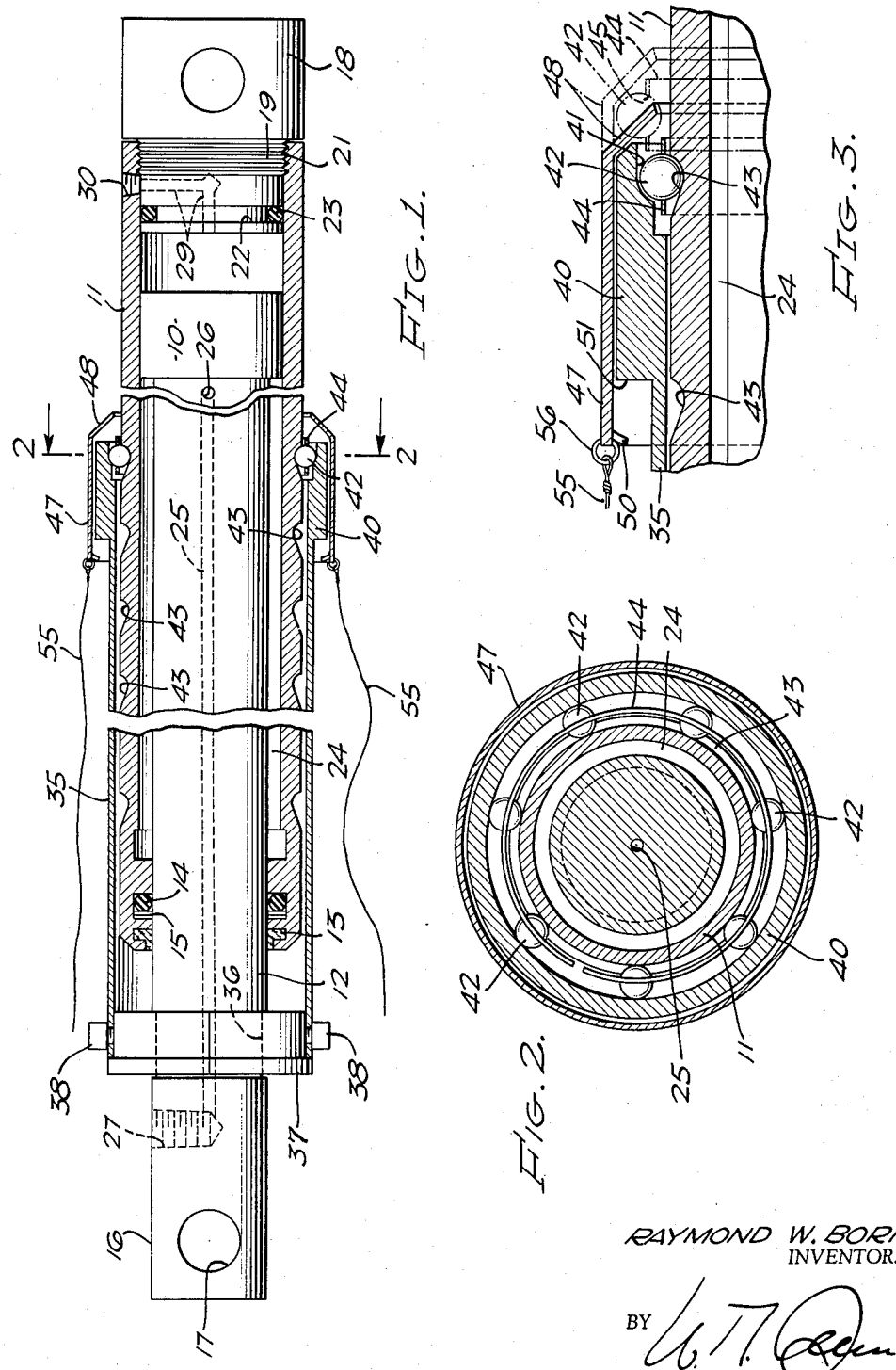

2,967,512
SELF-LOCKING CYLINDER ASSEMBLY
Raymond W. Born, 1618 Eldred St., West Covina, Calif.
Filed Oct. 28, 1958, Ser. No. 770,074
11 Claims. (Cl. 121—40)

This invention relates to pressure-operated cylinder assemblies and more particularly to an improved construction incorporating semi-automatic locking means effective to lock the assembly in a desired extended position notwithstanding the release or failure of the pressure system for the assembly.

There are many applications of pressure-operated cylinder assemblies in which failure of the cylinder pressure supply for any reason presents serious hazards not only to property but to persons in the vicinity. Such hazards arise through malfunctioning of the equipment, error on the part of an operator in control of the pressure equipment, the failure of the pressure supply and the like mishaps. The losses and hazards presented by such occurrences are obvious.

Although there are countless applications of cylinder assemblies having need for a foolproof safeguard against such accidents, there may be mentioned by way of example the cylinders employed to support the front end of tractor-drawn trailers in such wide-spread use for freight haulage. When the trailer arrives at its destination, it is the practice to detach the tractor for other continued use while a new load is being substituted for that then on the trailer. To this end, extendable cylinder struts are operated to support the front of the trailer during the absence of the tractor, these struts being held extended by a supply of pressurized fluid maintained on the trailer. Should this pressure supply fail for any reason, the strut will collapse allowing the front end of the trailer to fall to the ground. Should workmen be present, serious injury, if not death, can result.

Although attempts have been made heretofore to provide a satisfactory safeguard against collapse of extended cylinders under the above-referred to and the like operating conditions, none have been proposed which are satisfactory or positive in operation. By the present invention there is provided a simple, rugged locking device for cylinder assemblies which is positive in action and fully reliable. Essentially, the device comprises sleeve means surrounding the cylinder body with its remote end fixed to the outer end of the piston rod assembly. Movable detent means carried by the sleeve cooperate with any one of a series of detent grooves formed in the exterior of the cylinder. According to one preferred embodiment of the locking mechanism, these detents are normally held out of seating and locking engagement with the recesses leaving the cylinder assembly free for normal operation in the usual manner. Whenever the cylinder is to be left extended under loaded conditions, simple manipulation of the detent through a suitable operator-control means acts to shift the detent into seating engagement with an adjacent one of the detent recesses, following which slight movement of the piston moves the sleeve into locking engagement with the detents which are then effective to support the load should the pressure supply to the cylinder fail or be released through accident or otherwise. Unlocking of the cylinder is accomplished simply by extending the piston through the very short distance required to release the locking detents.

Accordingly, it is a primary object of the present invention to provide an improved pressure-operated cylinder assembly having operatively associated therewith positive locking means for holding the assembly in any selected extended position notwithstanding the failure or unintended release of the pressure supply to the cylinder.

Another object of the invention is the provision of a novel cylinder assembly provided with locking detents engageable selectively with a plurality of recesses provided along its exterior which detents are releasable from locked position only by the supply of a predetermined operating pressure to the interior of the cylinder.

Another object of the invention is the provision of a locking accessory adapted to be added to an existing cylinder assembly after the outer wall of the cylinder has been machined to provide a series of axially-spaced detent seating recesses cooperable with the locking accessory for safety purposes.

Another object of the invention is the provision of a cylinder assembly having asociated with the free end of its piston rod and the outer wall of its cylinder housing a locking device selectively operable at the user's election to lock the cylinder in an extended operating position under load, the lock being releasable only by the admission of sufficient additional pressurized fluid to extend the cylinder beyond its locked position.

These and other more specific objects will appear upon reading the following specification and claims and upon considering in connection therewith the attached drawing to which they relate.

Referring now to the drawing in which a preferred embodiment of the invention is illustrated:

Figure 1 is a longitudinal sectional view through a fluid operated cylinder assembly according to a preferred embodiment of the present invention and showing the piston locked against collapse;

Figure 2 is a transverse sectional view taken along line 2—2 on Figure 1; and

Figure 3 is a fragmentary view of the locking device on an enlarged scale showing the position of the parts in locked position, the dotted showing of certain parts representing the unlocked position of the parts.

Referring more particularly to Figure 1, there is shown a cylinder assembly incorporating a preferred embodiment of the invention. This assembly includes an outer tubular cylinder 11 having telescopically mounted therewithin a piston 10 fixed to one end of a piston rod 12 slidable through a packing gland 13 at one end of cylinder 11. This packing gland may include an O-ring 14 and washer shims 15. Gland 13 is normally filled with suitable packing material effective additionally as a wiper preventing dust and other foreign matter being carried into contact with O-ring 14 during collapse of the cylinder from an extended position. The outer end of the piston rod 12 is provided with coupling means 16 having an opening 17 for attaching the rod to the load to be moved by the piston. The remote and opposite end of cylinder 11 is likewise closed by a plug 18 having threads 19 mating with similar threads 21 formed in the inner side wall of cylinder 11. Plug 18 is preferably provided with a sealing groove 22 seating an O-ring seal 23.

Provision for admitting operating fluid under pressure to the opposite end faces of piston 10 includes a passage 25 extending axially of rod 12 and opening through a port 26 closely adjacent one end face of piston 10. The other end of passage 25 opens into a threaded radial port 27 adapted to seat the connection bushing of a flexible hose. Likewise, plug 18 is provided with a passage 29 opening through a threaded bore 30 in cylinder wall 11 and to which a bushing for a second hose connection may be connected. It will therefore be recognized that fluid under pressure may be admitted to one end of cylinder 11 as fluid present in the annular chamber 24 at the other end of the cylinder is withdrawn from the other passage. In this arrangement pressurized fluid in either liquid or gas form may be admitted to either or both ends of the cylinder to drive the piston means in either direction depending upon the type of installation employed. In installations requiring only that the piston be extended under load, fluid under pressure is admitted and withdrawn through passage 29, passage 25 then serving only as a vent for chamber 24. In these circumstances, it is preferable that a suitable filter and closure cap be seated in bore 27 to provide for venting while guarding against the admission of foreign matter to the assembly.

The locking device forming an important feature of this invention includes a rigid sleeve 35 fitting loosely about cylinder 11 and having the left-hand end thereof as viewed in Figure 1 rigidly secured to the outer free end of piston rod 12. To this end, rod 12 is provided with an annular groove 36 seating therein a diametrically-split ring 37, the two parts of which fit within groove 36 snugly. Sleeve 35 fits the periphery of split ring 37 and is rigidly secured thereto as by cap screws 38. When so assembled, it is impossible for ring 37 to become disassembled from the piston rod, and sleeve 35 is constrained to move in unison with piston 10 and rod 12.

The opposite end of sleeve 35 has an enlarged or thickened wall 40 encircling cylinder 11 and the inner wall of its outer end is recessed, as is clearly shown in Figure 3, to hold radially movable detent elements 42 positively locked in a juxtaposed one of a series of annular recesses 43 formed at spaced intervals along the exterior surface of cylinder 11. Detents 42 are preferably, but not necessarily, in the form of balls of uniform size and having smoothly finished exterior surfaces. Detents so formed move smoothly and readily into and out of locking position, it being pointed out that one rim edge of grooves 43 is beveled to lie at an angle of 10 to 20 degrees to the axis of the cylinder. Additionally, if formed of high strength material, as is preferred, they have very high load carrying ability. Locking detents 42 are shown as held captive and uniformly spaced circumferentially of cylinder 11 by means of split spring keeper or cage ring 44. In the arrangement illustrated, keeper ring 44 tends to assume a diameter larger than that indicated in dotted line in Figure 3. Furtermore, it will be understood that the openings through this keeper for seating detent balls 42 are of smaller diameter than the balls to the end that the balls cannot pass therethrough. Accordingly, ring 44 and openings 45 are effective to move balls 42 radially outward from detent seating grooves 43 when free to do so. This ring is also effective to hold the balls uniformly spaced in the manner best illustrated in Figure 2.

The means provided for pressing keeper ring 44 and seating balls 42 within one of recess grooves 43 comprises a control sleeve 47 freely shiftable axially of ring 40 and having an inwardly converging annular lip 48 at one end providing space for holding the locking detent balls 42 captive when in their released or non-locking position. This control sleeve 47 is held assembled to wall 40 of sleeve 35 by one or more inwardly struck tabs 50 engageable with shoulder 51 to limit movement of sleeve 47 to the left as viewed in Figure 3.

The means provided for moving control sleeve 47 to the left as viewed in Figure 3 to compress ring 44 and seat balls 42 in one of recesses 43 and inwardly of retaining wall 41 may take various forms. As here shown, this remote control means includes a pair of cables 55 connected to control sleeve 47 through rings 56. The opposite ends of the cables extend to an operator-control position usually adjacent the control valves for the pressure line leading to the inlet ports of the cylinder assembly. It will be understood that cables 55 may include tension springs which are normally fully relaxed allowing keeper spring 44 to hold balls 42 retracted out of locking position. However, upon the movement of a control lever not shown to a position tensioning the above-mentioned tension springs, the latter are tensioned and detents 42 are automatically forced into an adjacent one of locking grooves 43 as soon as the parts are moved into the proper position.

Normally, detents 42 are located in the dotted line position shown in Figure 3 wherein they are radially outside seating groove 43, the balls being held in this position by split spring ring 44. In these circumstances, the piston is free to be moved to any position along the cylinder in accordance with normal operating procedures and without danger of the pistons being locked against movement. Whenever it is desirable that the piston be locked against collapse for any reason, as while servicing operations are going on, or for other reasons, the operator extends the cylinder assembly to a desired position while maintaining tension on control cables 55 by hand pressure or by the use of the above described tension springs. Under these conditions, the inwardly-converged flanged end 48 of control sleeve 47 will cam balls 42 inwardly against cylinder 11. As the assembly moves into an extended position opposite one of the locking grooves or recesses 43 the tension on cable 55 causes balls 42 to seat within the groove. The operator readily senses this seating operation through cable 55 whereupon he releases a slight amount of the fluid being admitted to the cylinder assembly allowing piston 10 to collapse a short distance such that retaining surface 41 of sleeve 40 seats behind balls 42 positively locking them seated in the associated one of grooves 43. The tension on cable 55 may then be released and the equipment may be left without fear that the cylinder assembly can collapse. And this is true even though all fluid pressure should fail, it being understood that the locking means described is adequate to assume the full load capacity of the cylinder assembly.

To release the assembly from the described locked position, the operator merely opens the supply valve to admit fluid to the assembly to extend the piston a slight distance until wall 41 moves to the left as viewed in Figure 3 sufficiently to permit spring 44 to lift detents 42 out of groove 43. Spring 44 is sufficiently strong to lift the balls outwardly and simultaneously shift control sleeve 47 to the right by cam action against the inclined lip 48 of the control sleeve. If the fluid pressure is insufficient for any reason to extend piston 10 to release balls 42, it will be impossible to disengage the lock thereby providing assurance against unlocking the assembly under operating pressure conditions which are unsafe or inadequate.

Although the cylinder assembly illustrated and described above is arranged for locking only by the seating of the locking detents through action initiated by the operator, it will be understood that control sleeve 47 and keeper spring 44 may be designed to operate in a reverse manner and such that the balls are automatically biased inwardly toward seating and locking position unless forcibly held retracted through cables 55 so long as operating pressure is being applied to the cylinder.

While the particular cylinder assembly and positive locking device therefor herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A locking device for use on hydraulic cylinders of the type including piston means operating axially of a cylinder therefor and adapted to be extended against a load, said cylinder having a plurality of axially spaced depressions therein, detent means movable with said piston means exteriorly of said cylinder including freely floating locking detent means adapted to seat in an adjacent one of said depressions and means effective to lock said piston means and cylinder against axial movement in one direction so long as said detent means remains seated in one of said depressions, and means for locking said detent means against unintended displacement from the locked position thereof.

2. A locking device as defined in claim 1 characterized in that said depressions comprise a plurality of annular depressions formed in the exterior surface of said cylinder whereby the relative rotation of said piston and cylinder does not interfere with the operation of said detent means.

3. A locking device as defined in claim 1 characterized in that said locking detents include a plurality of balls and means for holding the same spaced apart circumferentially of said cylinder and lying in a plane substantially normal to the longitudinal axis of said cylinder.

4. A locking device as defined in claim 1 characterized in that said locking detent includes a sleeve encircling said cylinder with one end thereof fixed to said piston means externally of said cylinder, and means including detent balls held movably captive between said sleeve and said cylinder for movement into and out of locking engagement with one of said depressions.

5. A locking device as defined in claim 3 characterized in the provision of means normally holding said balls in one position relative to said depression and including means for moving said balls to a converse position relative to said depression when the balls are disposed radially opposite the depression, said piston being locked against axial movement in one of said positions and free to move axially of said cylinder in the other position of the balls.

6. In combination, a pressure operated cylinder assembly including a tubular cylinder enclosing a piston and piston rod unit movable axially thereof in response to a pressure differential across said piston, movable detent means operatively associated with said piston rod and cooperable with recess means in the outer surface of said cylinder to lock said piston against axial movement in at least one direction so long as said movable detent means is engaged in said recess, said detent means including means for selectively locking said detent means positively engaged with said recess means in one position thereof and leaving said detent means free to move out of said recess means in a second position thereof.

7. The combination defined in claim 6 characterized in that said movable means comprises a plurality of detents held circumferentially spaced about said cylinder by resilient means effective to bias said detents radially with respect to said cylinder.

8. The combination defined in claim 7 characterized in that said resilient means is effective to bias said detents out of locking engagement with said recess in said cylinder when said detents are positioned thereopposite.

9. The combination defined in claim 7 characterized in the provision of means operable to move said detents radially in opposition to said resilient means.

10. A self-locking device for locking a pressure operated cylinder assembly against axial movement and collapse due to the failure of pressure supplied to said cylinder assembly, said device comprising sleeve means secured at one end to the rod of a piston movable axially within said cylinder and having its other end telescoped over said cylinder, said cylinder having axially spaced grooves opening through its outer surface, a plurality of ball detents operatively associated with juxtaposed portions of said sleeve and including manually operable means for shifting said balls in one direction relative to an adjacent one of said grooves and other means automatically operable to shift the balls in the opposite direction relative to said groove at other times, said balls being effective when held seated in one of said grooves by said sleeve to lock said piston against movement and leaving said piston free to move axially of said cylinder when said balls are detached from any groove.

11. A locking accessory for use with a pressure operated cylinder assembly to prevent said assembly from collapse under load through failure of the operating pressure, said locking accessory comprising a tubular member of larger diameter than the cylinder with which said member is to be used, said tubular member including means at one end for clamping the same to the outer end of the piston rod of a cylinder assembly, the other end of said tubular member having movably mounted thereon a plurality of locking detents, said detents normally being adapted to be positioned out of contact with the exterior surface of a cylinder housing and axially spaced recesses therealong, said detents being movable into seating engagement with a juxtaposed recess in the exterior surface of a cylinder housing and including means for holding said detents seated therein to prevent collapse of the cylinder from an extended position thereof by failure of the pressure supply system or like mishap.

References Cited in the file of this patent
UNITED STATES PATENTS

| | | |
|---|---|---|
| 1,512,837 | Evenden | Oct. 21, 1924 |
| 2,204,279 | Meyer | June 11, 1940 |
| 2,540,578 | Hall | Feb. 6, 1951 |
| 2,553,632 | Clark | May 22, 1951 |
| 2,838,027 | Branick | June 10, 1958 |